(12) United States Patent
Elhassani et al.

(10) Patent No.: US 8,478,065 B2
(45) Date of Patent: Jul. 2, 2013

(54) PIXEL PROCESSING

(75) Inventors: Mohammed Elhassani, Caen (FR); Marc André Georges Duranton, Veldhoven (NL); Stephanie Jehan-Besson, Hérouville Saint Clair (FR)

(73) Assignee: Entropic Communications, Inc., San Diego, CA (US)

( * ) Notice: Subject to any disclaimer, the term of this patent is extended or adjusted under 35 U.S.C. 154(b) by 634 days.

(21) Appl. No.: 12/681,366

(22) PCT Filed: Oct. 1, 2008

(86) PCT No.: PCT/IB2008/053992
§ 371 (c)(1),
(2), (4) Date: Jul. 9, 2010

(87) PCT Pub. No.: WO2009/044348
PCT Pub. Date: Apr. 9, 2009

(65) Prior Publication Data
US 2010/0266203 A1 Oct. 21, 2010

(30) Foreign Application Priority Data
Oct. 1, 2007 (EP) ..................................... 07291192

(51) Int. Cl.
*G06K 9/38* (2006.01)
(52) U.S. Cl.
USPC ........... 382/270; 382/274; 382/272; 382/273; 348/229.1; 345/589

(58) Field of Classification Search
USPC .................................................. 382/270–273
See application file for complete search history.

(56) References Cited

U.S. PATENT DOCUMENTS

| 5,146,319 A | 9/1992 | Engel et al. |
| 5,416,532 A | 5/1995 | Ko |
| 6,148,116 A | 11/2000 | Park |

(Continued)

FOREIGN PATENT DOCUMENTS

| EP | 0268332 A1 | 5/1988 |
| EP | 0963112 A1 | 12/1999 |

(Continued)

OTHER PUBLICATIONS

C. Hentschel et al., "Effective peaking filter and its implementation on a programmable architecture", Consumer Electronics, IEEE Transactions on vol. 47, Issue 1, Feb. 2001, pp. 33-39.

(Continued)

*Primary Examiner* — Chan S Park
*Assistant Examiner* — Mark Roz
(74) *Attorney, Agent, or Firm* — Bruce W. Greenhaus; Richard A. Bachand; Duane Morris LLP (57) ABSTRACT

A method of processing pixels of an image comprises determining the most homogenous region of the image, calculating a threshold (th) according to the content of the determined region, selecting pixels in the image according to the calculated threshold (th), and applying a gain to the selected pixels. The method can also further comprise calculating the gain according to the content of the image.

16 Claims, 8 Drawing Sheets

U.S. PATENT DOCUMENTS

| | | |
|---|---|---|
| 6,810,082 B1 | 10/2004 | Shen et al. |
| 2002/0051088 A1 | 5/2002 | Ikeda et al. |
| 2003/0169941 A1 | 9/2003 | Lin et al. |
| 2004/0081370 A1* | 4/2004 | Murphy ........................ 382/286 |
| 2004/0120597 A1 | 6/2004 | Le Dinh |
| 2005/0157189 A1 | 7/2005 | Sambongi |
| 2005/0285977 A1 | 12/2005 | Nako et al. |

FOREIGN PATENT DOCUMENTS

| | | |
|---|---|---|
| EP | 1411469 A2 | 4/2004 |
| EP | 1480449 A2 | 11/2004 |
| EP | 1677516 A1 | 7/2006 |
| GB | 2171273 A | 8/1986 |
| WO | 0167392 A2 | 9/2001 |

OTHER PUBLICATIONS

International Search Report for PCT/IB2008/053992 mailed Mar. 4, 2009.

International Preliminary Report on Patentability for PCT/IB2008/053992 mailed Apr. 7, 2010.

Christophe Fiori et al., "Two linear time Union-Find strategies for image processing", Theoretical Computer Science, 1996, pp. 165-181, vol. 154.

M.A. Badamchizadeh et al, "Comparative study of unsharp masking methods for image enhancement", Image and Graphics, Proceedings. Third International Conference on Dec. 20, 2004, pp. 27-30.

* cited by examiner

PIXEL PROCESSING

This invention relates to a method of and a system for processing pixels of an image.

In almost all contemporary televisions peaking techniques are used to enhance the displayed picture. This means that the edges are sharpened in the luminance channel by using of peaking or peaking-like circuits such as, for instance, luminance transient improvement techniques. By such techniques black parts near the edge are usually pushed towards a more black colour and white parts are pushed towards a more white colour. As a result the picture appears sharper and crisper. The correct application of such techniques in a manner that is appropriate for a wide variety of different images is technically very complex.

For example, International Patent Application Publication WO 01/67392 discloses a system and method for improving the sharpness of a video image. In this document, there is disclosed an apparatus for sharpening an edge in a video image. The apparatus comprises: 1) a first circuit for determining a first luminance value of a first pixel associated with the first edge and a second luminance value of a second pixel associated with the first edge, wherein the first and second pixels are adjacent pixels; 2) a second circuit for determining a position of a first subpixel disposed between the first and second pixels, wherein the first subpixel position is disposed approximately at a center of the first edge; 3) a third circuit for increasing a luminance value of a second subpixel disposed on a first side of the first edge center; and 4) a fourth circuit for decreasing a luminance value of a third subpixel disposed on a second side of the first edge centre opposite the first side. This document explains how peaking can be applied to the pixels in an image. However all known techniques are not sufficiently flexible, i.e. it is known that when handling radically different images there will always be the possibility of incorrect edge enhancement, as individual techniques tend to be optimised for only certain types of images.

It is therefore an object of the invention to improve upon the known art.

According to a first aspect of the invention, there is provided a method of processing pixels of an image comprising determining the most homogenous region of the image, calculating a threshold according to the content of the determined region, selecting pixels in the image according to the calculated threshold, and applying a gain to the selected pixels.

According to a second aspect of the invention, there is provided a system for processing pixels of an image comprising a receiver arranged to receive an image, and a processor arranged to determine the most homogenous region of the image, to calculate a threshold according to the content of the determined region, to select pixels in the image according to the calculated threshold, and to apply a gain to the selected pixels.

According to a third aspect of the invention, there is provided a computer program product on a computer readable medium for processing pixels of an image, the product comprising instructions for determining the most homogenous region of the image, calculating a threshold according to the content of the determined region, selecting pixels in the image according to the calculated threshold, and applying a gain to the selected pixels.

Owing to these aspects of the invention, it is possible to provide a method of adaptive peaking that processes the pixels in an image based upon the content of the image. A threshold is dynamically set (and will be reset for every image in a stream of images) that reflects the content of the image, and this leads to a selection of pixels for peaking that will provide a good end result in relation to the perceived quality of the image by a viewer of that image, but will also be appropriate for a wide range of source images.

According to a fourth aspect of the invention, there is provided a method of processing pixels of an image comprising calculating a threshold, selecting pixels in the image according to the calculated threshold, calculating a gain according to the content of the image, and applying the gain to the selected pixels.

According to a fifth aspect of the invention, there is provided a system for processing pixels of an image comprising a receiver arranged to receive an image, and a processor arranged to calculate a threshold, to select pixels in the image according to the calculated threshold, to calculate a gain according to the content of the image, and to apply the gain to the selected pixels.

According to a sixth aspect of the invention, there is provided a computer program product on a computer readable medium for processing pixels of an image, the product comprising instructions for calculating a threshold, selecting pixels in the image according to the calculated threshold, calculating a gain according to the content of the image, and applying the gain to the selected pixels.

Owing to these aspects of the invention, it is possible to further provide method of adaptive peaking that sets the gain of the pixels in an image based upon the content of the image. The gain applied to the pixels in an image is dynamically set (and will be reset for every image in a stream of images) that reflects the content of the image, and this leads to a selection of pixels for peaking that will provide a good end result in relation to the perceived quality of the image by a viewer of that image, but will also be appropriate for a wide range of source images.

Advantageously, the step of calculating the gain according to the content of the image includes computing a value equal to the normalised accumulated histogram of transitions higher than the calculated threshold. The calculated threshold is used to determine which pixels in the image will have peaking applied to them. This threshold can also be used to determine the level of the gain that is actually applied to the individual pixels. This can be used in a formula for the gain that once again means that the peaking that is carried out on an image is better suited to the content of that image.

Preferably, the step of calculating the gain according to the content of the image comprises calculating the gain for a specific pixel to be equal to the maximum grey level (g) of the image multiplied by the computed value ($H_{ha}$) multiplied by an output of a filter of the specific pixel. The use of this formula for generating the gain value delivers a consistent performance for the application of peaking to the selected pixels within the image.

Ideally, the step of determining the most homogenous region of the image comprises segmenting the image into smaller segments according to a predetermined algorithm, and determining a homogeneity value for each segment, and the step of determining a homogeneity value for each segment comprises determining the variance of the pixels in the respective segments. Segmentation of the image to determine the most homogenous region is a simple and efficient method for delivering a decision about the content within the image. The algorithm can very quickly determine the most homogenous region within image based upon variance between the pixels within a specific segment.

Embodiments of the present invention will now be described, by way of example only, with reference to the accompanying drawings, in which:—

Figure 1:
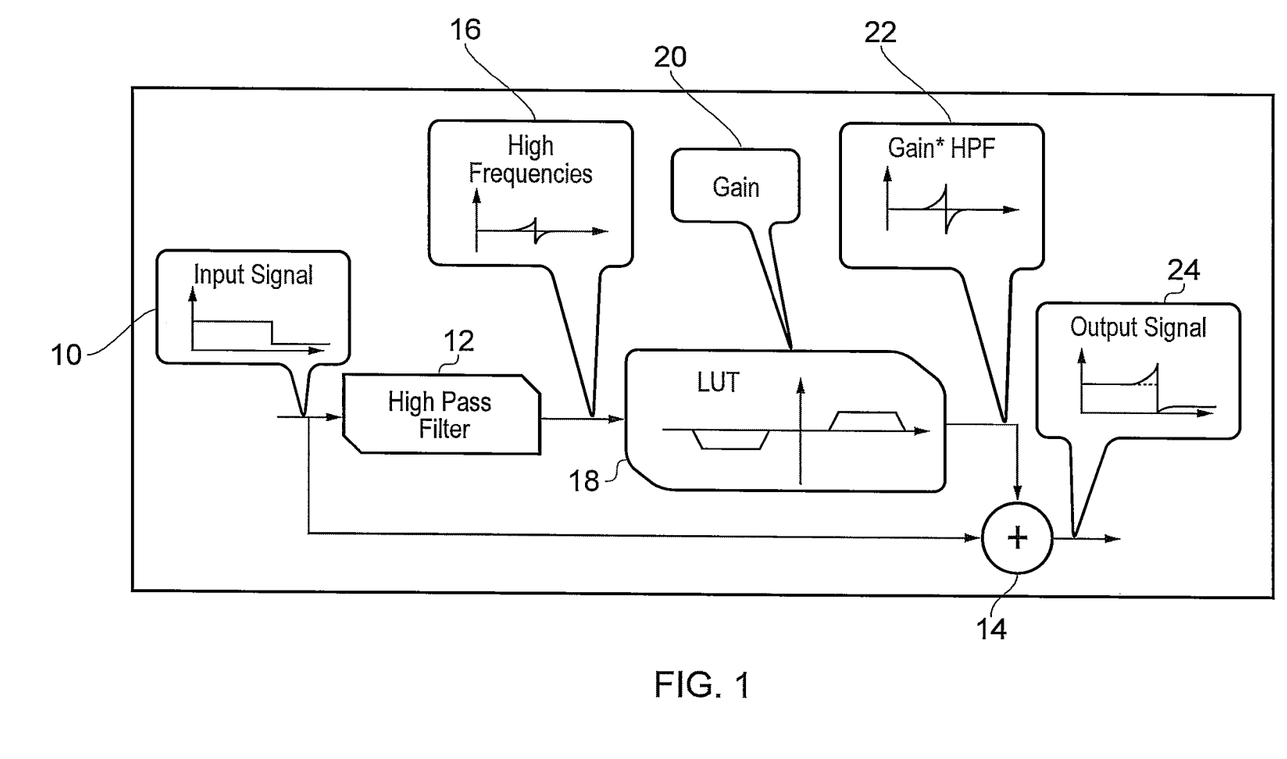
FIG. 1 is a schematic diagram of a peaking process.

The use of peaking is one of the most well known image improvements. The use of peaking improves image edges within an image by making them stronger. FIG. 1 shows the classical approach to achieve peaking. An input signal 10, which is a component within an image, is fed to a high pass filter 12 and to an adder 14. The high pass filter (HPF) 12 removes all but the high frequency components 16. These components are modified by a look-up table (LUT) 18, which effectively applies a predefined gain 20 to the high frequency components 16. The output of the LUT 18 is represented by the signal 22, which is the gain 20 multiplied by the output of the HPF 12. This output 22 is fed as the second input to the adder 14, which sums this output 22 back onto the original input signal 10, to produce the final output signal 24. The process shown in FIG. 1 is applied to those pixels within an image, for which it is determined that peaking is required, to improve the sharpness of the edges within that image.

Many works in the literature focus on the design of the high pass filter 12. For example, the article "Effective peaking filter and its implementation on a programmable architecture" by C. Hentschel and D. La Hei, published in Consumer Electronics, IEEE Transactions on Volume 47, Issue 1 February 2001 pages 33 to 39, is an example of the design of such a high pass filter 12. In the article by M. A. Badamchizadeh and A. Aghagolzadeh entitled "Comparative study of unsharp masking methods for image enhancement" published in Image and Graphics, 2004, Proceedings of Third International Conference, 18 to 20 Dec. 2004 on pages 27 to 30, the authors give a comparison of a different approach of high pass filtering.

However there is not enough work to adapt the gain to the content of the image. A good choice of the gain will consider the following points, avoiding noise and encoding artifact amplification, higher peaking gain should be assigned to edges belonging to textures, and avoiding signal distortion, which occur along stronger edges and is annoying when edges separate two homogeneous regions.

In a dynamic peaking approach, such as disclosed by G. J. M. Vervoort. "Real Time enhancement with TriMedia of decoded MPEG video" Nat. Lab Technical Note 2001/559, date of issue 02/02, the gain is set statically in a LUT, which provides no way to tune it depending on the image content. In the article by M. C. Q. Farias, F. Oberti, and I. E. J. Heynderickx "Perceptual Analysis of sharpness Enhanced video Algorithms". Nat. Lab Technical Note PR-TN-2003/00433, date of issue 06/03, the gain value is chosen in order to minimize a metric computed over a bloc of 8×8, the minimization process needs many iterations, and the bloc-based computation doesn't consider a global characteristics of the image (such as noise, textures and artifacts).

In this invention it is proposed to tune the gain depending on the image nature, such as whether the image is noisy, encoding artifacts, contains a lot of textures or more flat regions. So the problem that is addressed is how to perform the peaking that is applied to pixels within the image so that it is adaptive to the image content, in order to peak only those pixels that should be peaked within the image. This has the benefit that there is no need to change the gain applied in the peaking process by hand. The choice of pixels to apply peaking and the level of peaking applied is all done automatically.

The essential feature of the invention is a method of processing pixels of an image which comprises determining the most homogenous region of the image, calculating a threshold according to the content of the determined region, selecting pixels in the image according to the calculated threshold, and applying a gain to the selected pixels. The method also advantageously further comprises calculating the gain according to the content of the image.

Figure 2:
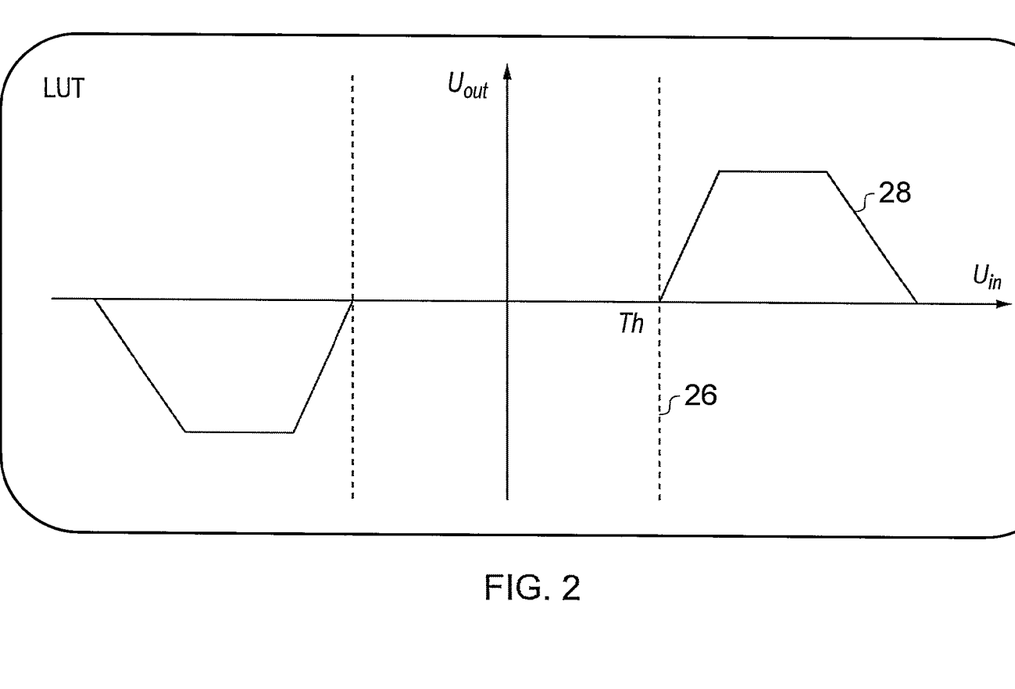
FIG. 2 is a schematic diagram of a gain used in a peaking process.

The new peaking algorithm, which is an adaptive peaking, uses two main ideas. The first one is using a statistical segmentation to set a threshold "th". This threshold 26 is shown in FIG. 2. Those edges in the image with values under "th" are not peaked. This threshold value is determined dynamically and changes for each image. The second idea is using an equalization of edge's histogram to set the gain, which is the curve 28 in FIG. 2, for edges with values above "th". The look-up table of FIG. 2 defines the processing that occurs on the image received. Only those pixels that are selected according to the threshold 26 have peaking applied to them, and the extent of the peaking is determined by the gain 28. The calculation of the threshold 26 is discussed in detail below, but is selected according to the content of the image, and the threshold is continually changed as each new image has peaking applied to it.

Figure 3:
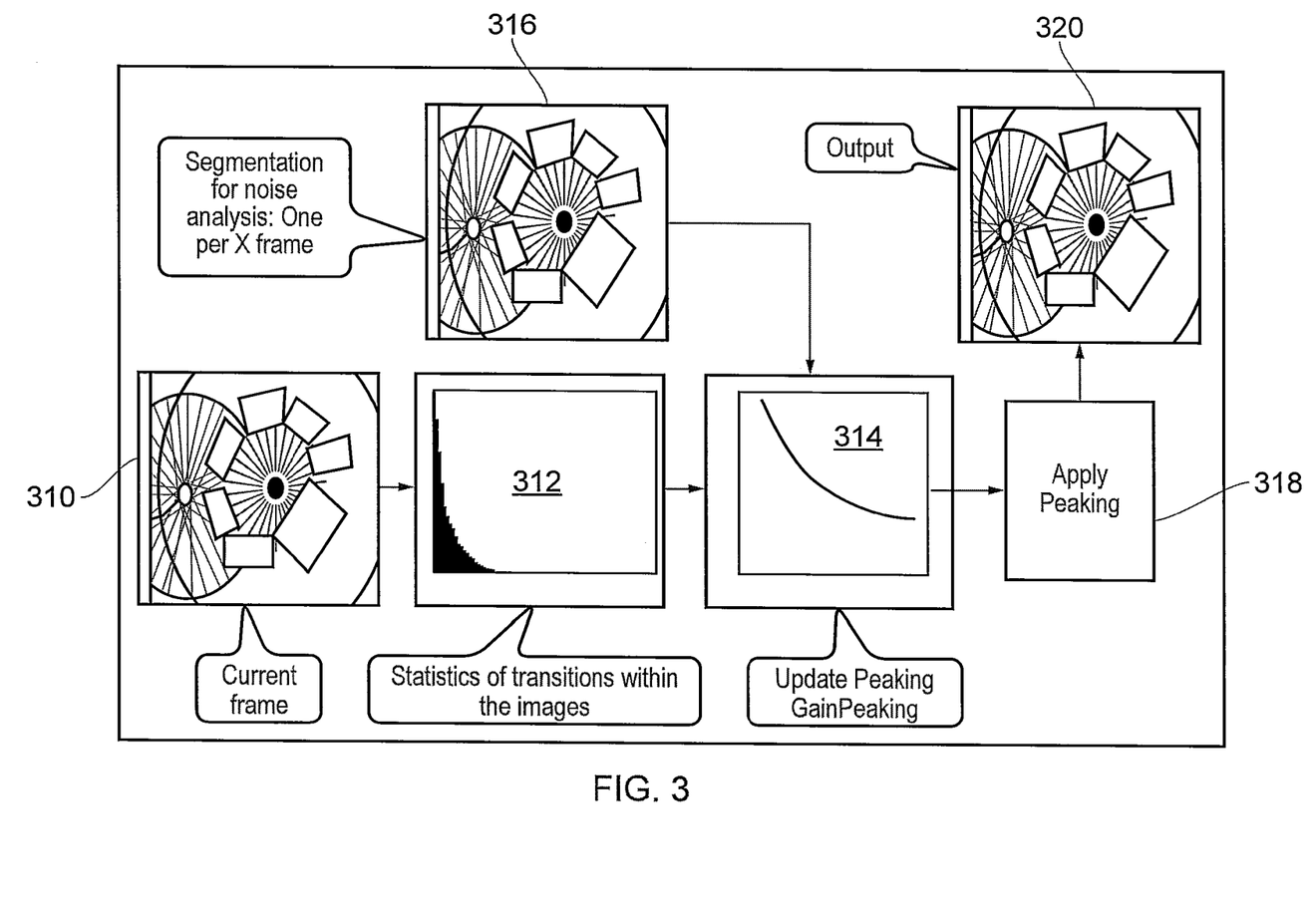
FIG. 3 is a schematic diagram of an adaptive peaking process.

FIG. 3 summarises the general adaptive peaking process. The current image 310 of the video sequence is processed to compute the histogram of transitions 312 within the image. In parallel with this, the image is segmented to compute "th" at stage 316. It is not essential to update the threshold "th" for each frame, as image noise and nature do not change abruptly. Consequently it is possible to configure the process so that there is an update of "th" only once every x frames. The value x could be fixed depending on the processing power of the system. By using "th" and the histogram of transition within the current image, the peaking gain is updated 314. Once the peaking gain is updated it is applied to the current image at step 318 and the end result is the peaked image 320.

When an image is received that is to have peaking applied to it, it is required to calculate the threshold th that is to be used in the peaking process. To achieve this, it is necessary to determine the most homogenous region of the image, and this is accomplished by segmenting the image into smaller segments according to a predetermined algorithm, and determining a homogeneity value for each segment. The determining of a homogeneity value for each segment comprises determining the variance of the pixels in the respective segments.

Figure 4:
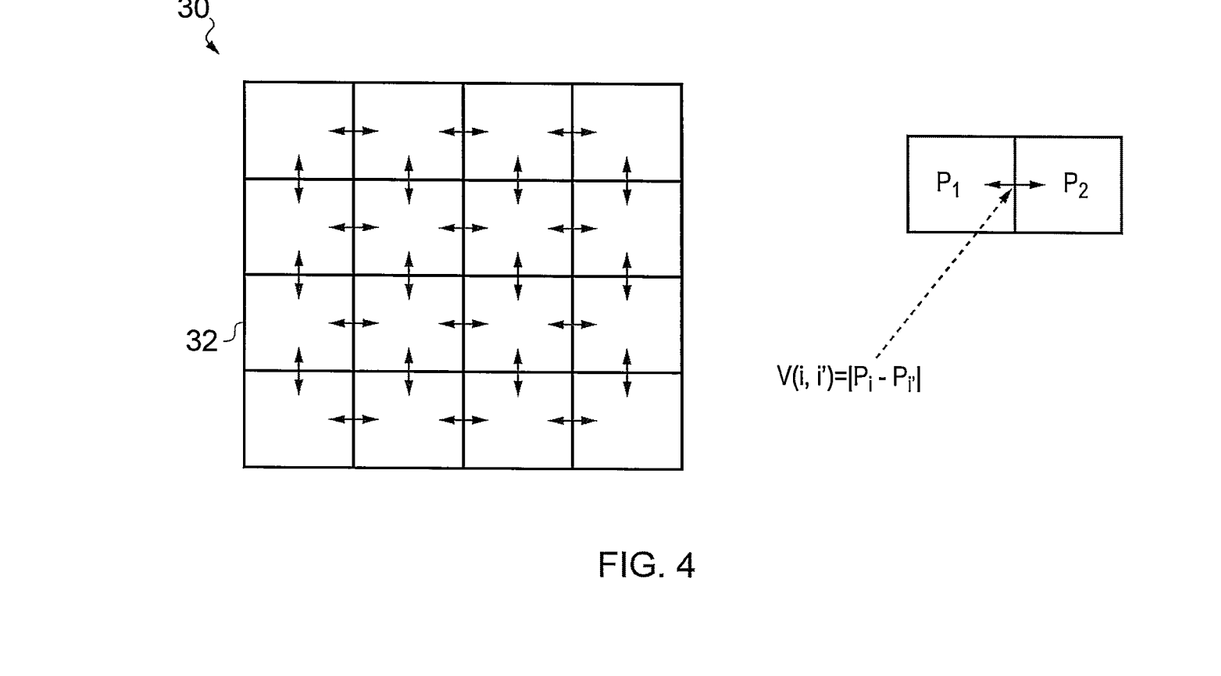
FIG. 4 is a schematic diagram of an image showing edges between pixels.

Effectively, the process uses segmentation of the received image to set the threshold "th". This is achieved by the use of a segmentation algorithm. FIG. 4 shows an image 30 comprised of pixels 32. The segmentation algorithm is realized as follows:

(a) Firstly, all of the edges between the pixels 32 (in all four directions) are computed and then ordered from low to high. FIG. 4 gives example of how this step is computed, with respect to the 4×4 pixel array that is used to make up the image

30. It will be understood that in reality, the resolution of the image 30 will be much larger, and will comprise a very much larger number of pixels. The peaking process described in this document is independent of the size of the image 30.

An edge corresponds to a couple of pixels (Pi, Pi') in the 4-connectivity. The value of this edge is the absolute difference between the two pixels (Pi, Pi'). All of the edges in the image 30 are ordered so that they are increasing in value. For a generalised case, consider an image with size w*h. The number of edges within the image is equal to Ne=w*(h−1)+ h*(w−1). A table "T[Ne]" is created. Each edge has an identifier (to identify each edge between two pixels 32 within the image 30) and a value. Identifiers of edges are ordered in "T[ ]" from the low to high value of their edges. Therefore, in "T[0]" there is stored the identifier of the edge having the lowest value, In "T[1]" there is stored the identifier of the edge having an equal or next larger value and so on until processing all the edges within the image. "T[Ne]" stores the largest value of an edge.

In the example of FIG. 4, there are twenty-four different edges present in the image 30, and these are placed in a table from 1 to 24, with entry 1 storing the identifier of the edge with the lowest value, and the value of that edge (the value being the difference between the two pixels 32 that make up the respective edge). The remaining edges are ordered in the rest of the table up to entry 24.

(b) Following the ordering of edges in the image, the next step is to carry out merging. Following the ordering an algorithm is executed as shown below:

---

For i = 0 to i = Ne.
{
    1-Edge_Identifier = T[i].
    2-Compute (P1, P2): the two pixels connected by the edge identified by Edge_Identifier.
        3- R1 = FIND(P1): R1 is the label of the region to which belongs P1.
        4- R2 = FIND(P2): R2 is the label of the region to which belongs P2.
        5- If (Criterion (R1, R2) = true) then UNION(R1, R1) else do nothing.
}

---

The fifth statement in the algorithm means that if the difference between average luminosities of the two regions R1 and R2 is lower than a threshold (this threshold is a function of the two cardinals N1 and N2 of the two regions R1, R2), then R1 and R2 are joined in one region. R1 is the label of the region to which the pixel P1 belongs and R2 is the label of the region to which the pixel P2 belongs. FIND(P) is the function which finds the representative of the region to which the pixel P belongs. UNION(R1, R2) is the function that makes the two labels equivalent, so the two pixels (R1, R2) belongs to the same region. The UNION and FIND functions are classical algorithms used in the image segmentation algorithms (See for example, C. Fiorio and J. Gustedt, "Two linear time Union-Find strategies for image processing" Theoretical Computer Science on Volume 154, 1996 pages 165 to 181). The function in the fifth statement of the algorithm is defined as follows:

$$\text{Criterion}(R_1, R_2) = (|\overline{R_1} - \overline{R_2}|^2 \leq S * \left(\frac{1}{N_1} + \frac{1}{N_2}\right)$$

where $\overline{R_1}, \overline{R_2}$ are the colour averages of R1 and R2 respectively, and S is a parameter set by the user in order to tune the coarseness of the segmentation. When S is big the image is undersegmented. When S is small the image is oversegmented. To achieve a good balance it is possible to set this value to $S=g^2$ (where g is the maximum grey level of the image=255). After the loop i=0 to Ne has been completed then there are left several regions, each of which contain a number of pixels. The pixels don't necessarily have the same luminosities.

Figure 5:
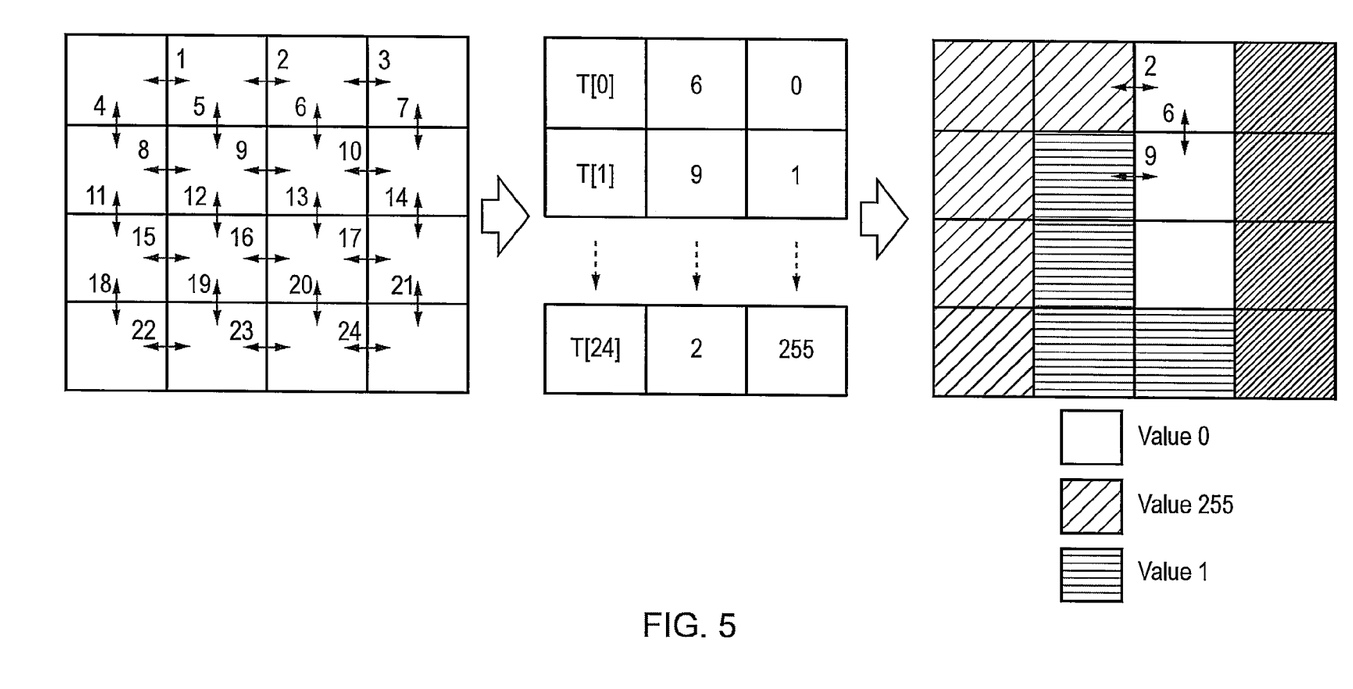
FIG. 5 is a schematic diagram of a segmentation process applied to an image.

FIG. 5 summarises the process that occurs during segmentation. On the left the edges of the pixels are calculated and then ordered in a table, shown in the centre. The table orders the edges from low to high, with in this case edge number 6 having a value of 0 (the difference between the two pixels that lie on either side of edge 6), and so on down to the edge that has the largest difference. Once this table has been generated, then the segmentation algorithm described above works on the table to segment the image into separate regions. In this example, the algorithm has split the image into four different areas within the original image. This is purely an example to illustrate the possible output of the segmentation algorithm.

Once the segmentation has been accomplished, then the next step in the peaking process is the setting of the threshold th, which is achieved by using the result of the segmentation. The threshold th is a threshold computed for the whole image and not for any individual region within the image. This threshold is computed by considering the most homogeneous region within the image. After the segmentation step, the peaking process extracts $R_h$, the most homogeneous region in the image, in the sense of variance. The variance $\upsilon_R$ within a region R is:

$$\vartheta_R = \frac{1}{|R|} \sqrt{\sum_{p \in R} (Y[p] - \overline{Y_R})^2}$$

where |R|, Y[p], $\overline{Y_R}$ are respectively the cardinal of region R, the luminance value of the pixel p and average of luminance in region R. Then there is computed the accumulated histogram $H_a$ of transitions within $R_h$ (such transitions being computed with the Hentschel filter referred to above). Then the threshold th is the transition value that verifies:

$$\alpha |R_h| - 1 \leq Ha[th] < \alpha |R_h|$$

where $\alpha$ is a percentage of the number of pixels within this homogeneous region. A good result is achieved by setting $\alpha$ to 0.7.

Once this threshold th has been determined this is used to select those pixels to which peaking is applied. The extent of the gain applied is calculated in the following manner. For the transitions higher than th, the peaking is applied in the following way. First the image is parsed and $H_{ha}$ is computed, which is the normalized accumulated histogram of transitions higher than th, which is normalized by the size of the image. Then the peaking operation is:

$$Y_{enh}[p] = Y[p] + 255 * H_{ha}[HPF[p]]$$

where Y[p], $Y_{enh}$[p] and HPF[p] are respectively the original, the enhanced luminance value and the result of Hentschel filter at the position p=(x, y).

The main application of the invention is in image enhancement in television and video systems, and particularly after a scaling operation.

The setting of the gain means that two images containing transitions with the same value but at the different frequency (number of time that the transition is present in the image) will have different gains applied to them. For example, in FIG. 6a, the first image, has one column transition at the middle of the image, and FIG. 6b, the second image, with five column transitions. In the second image shown in FIG. 6b, the transition that is in the middle of the image is identical to the transition in the first image of FIG. 6a.

Figure 6A:
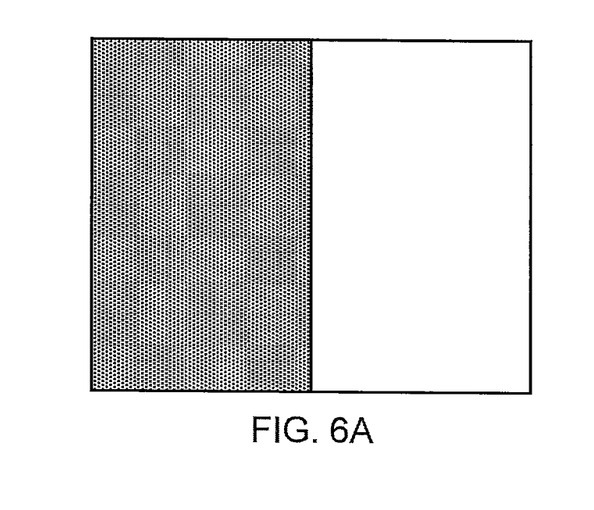
FIG. 6 is a diagram of two images.
Figure 6B:
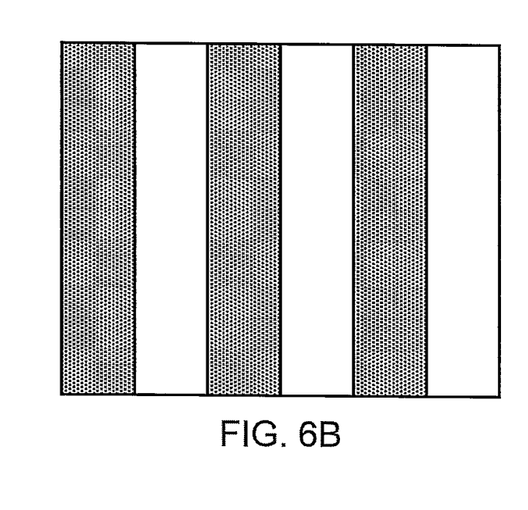

All existing peaking algorithms will enhance in exactly the same manner the transition in the middle of the image for both images 6a and 6b. The peaking process described above will not do so as the peaking gain depends on the transition frequency within the image as a whole. By comparing the pixel values after enhancement in the middle of the first image with those in the middle of the second image, it is possible to show the different gains that have been applied to the same edge in the same location.

Figure 7:
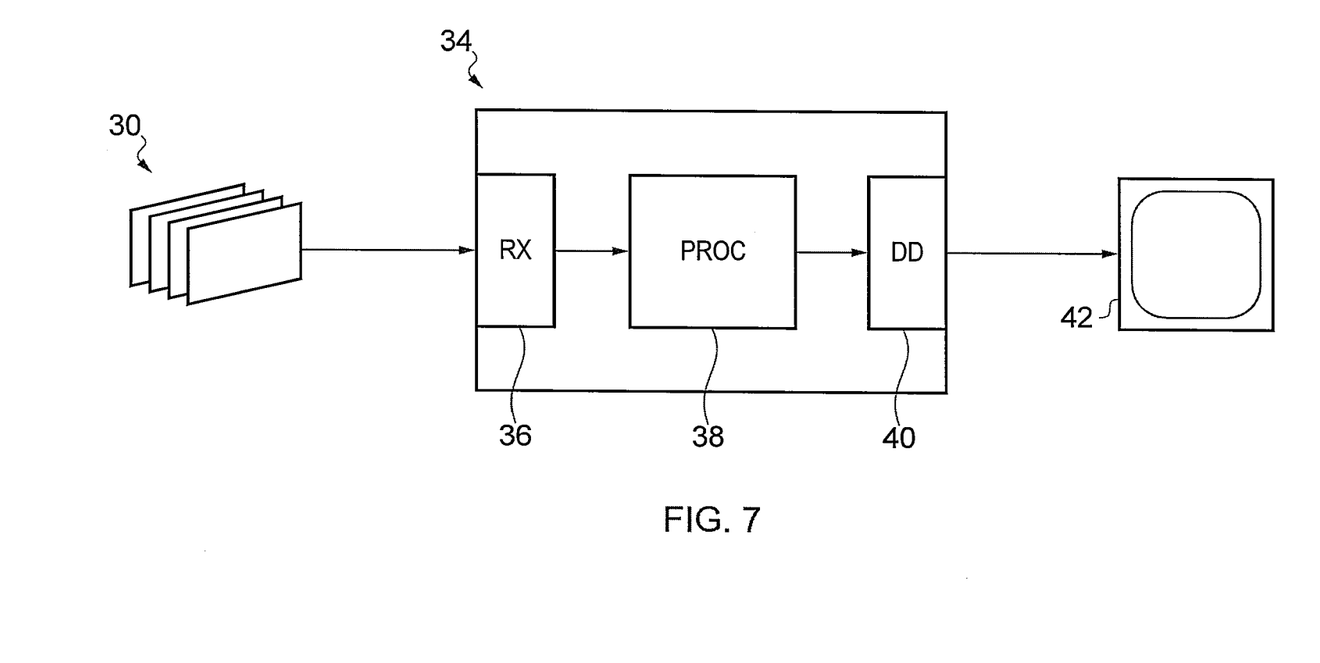
FIG. 7 is a schematic diagram of a system for processing pixels in an image.

FIG. 7 shows an example of a system 34 for processing pixels of an image 30 (or series of images). The system 34 comprises a receiver 36, which is arranged to receive the image 30, a processor 38, and a display driver 40. The output of the display driver 40 is used to drive a display device 42. The processor 38 is arranged to determine the most homogenous region of the image 30, to calculate the threshold (th) according to the content of the determined region, to select pixels in the image according to the calculated threshold (th), and to apply a gain to the selected pixels. In this way an adaptive peaking process is performed that has two principal components. The first is that a threshold th is set according to the content of the image 30, and this determines which pixels within the image will be peaked. The second is that the amount of peaking, the gain applied to those pixels selected for peaking, is again determined by the content of the image.

Figure 8:
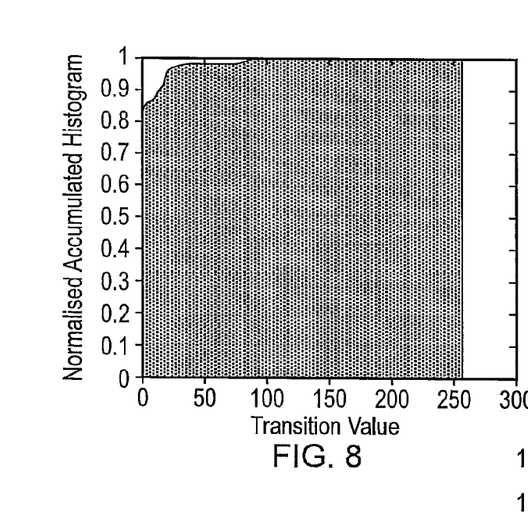
FIG. 8 is a normalised accumulated histogram of an image region.
Figure 9:
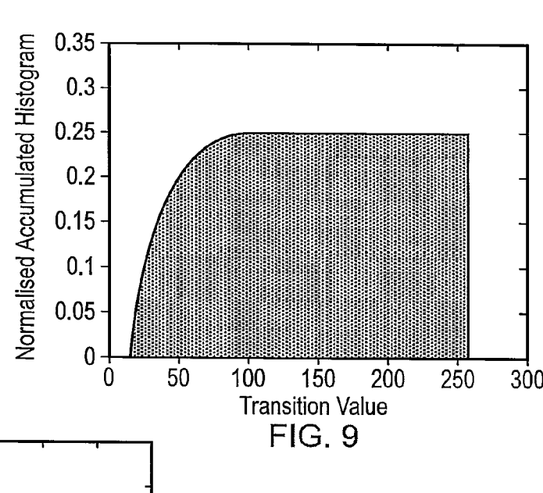
FIG. 9 is a normalised accumulated histogram of an image.
Figure 10:
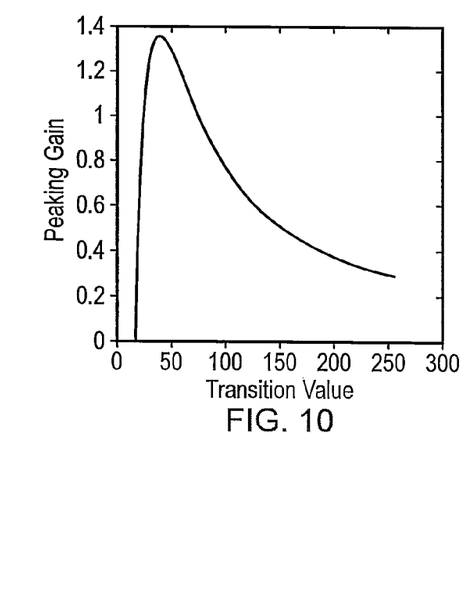
FIG. 10 is a graph showing the peaking gain calculated from the histogram of FIG. 9.

FIGS. 8, 9 and 10 show some of the data that is generated from the peaking process, as carried out by the system of FIG. 7, according to the process shown in FIG. 3. Each image 30 that is processed to have the peaking gain applied goes through two parts: a segmentation to find the most homogenous region of the image, which is then used to determine the threshold th which determines which pixels have the peaking applied, and a setting of the gain to be applied, according to the content of the image 30. FIG. 8 shows a normalised accumulated histogram of the most homogenous region from an image 30, which is then used in the noise threshold determination. FIG. 9 shows a normalised accumulated histogram corresponding to an image 30 which is then used to calculate the peaking gain. This gain level is shown in FIG. 10, which is derived from the normalised accumulated histogram of FIG. 9.

The invention claimed is:

1. A method of processing pixels of an image comprising:
    segmenting the image into smaller segments according to a predetermined algorithm;
    determining a variance of pixels in the respective segments;
    determining a homogeneity value from the variance of the pixels in the respective segments;
    determining a most homogenous region of the pixel image from the homogeneity value;
    calculating a first normalized accumulated histogram of the edge transitions within the most homogenous region;
    calculating a threshold value based on the first histogram;
    calculating a second normalized accumulated histogram of the edge transitions that are above the threshold value;
    calculating a gain of the image peaking from the second histogram;
    using the threshold value to select those pixels to which image peaking is to be applied; and
    applying the gain to the selected image pixels.

2. The method according to claim 1, wherein the calculating a gain comprises calculating the gain for a specific pixel to be equal to the maximum grey level of the image multiplied by the computed value multiplied by an output of a filter of the specific pixel.

3. A system of processing pixels of an image comprising:
    a receiver arranged to receive an image; and
    a processor arranged to
        segment the image into smaller segments according to a predetermined algorithm;
        determine a variance of pixels in the respective segments;
        determine a homogeneity value from the variance of the pixels in the respective segments;
        determining a most homogenous region of the pixel image from the homogeneity value;
        calculate a first normalized accumulated histogram of the edge transitions within the most homogenous region;
        calculate a threshold value based on the first histogram;
        calculate a second normalized accumulated histogram of the edge transitions that are above the threshold value;
        calculate a gain of the image peaking from the second histogram;
        use the threshold value to select those pixels to which image peaking is to be applied; and
        apply the gain to the selected image pixels.

4. The system according to claim 3, wherein the processor is arranged, when calculating a gain, to calculate the gain for a specific pixel to be equal to the maximum grey level of the image multiplied by the computed value multiplied by an output of a filter of the specific pixel.

5. A non-transitory computer readable medium encoded with data and instructions to process pixels of an image, that when executed by a computer, causes the computer to:
    segment the image into smaller segments according to a predetermined algorithm;
    determine a variance of pixels in the respective segments;
    determine a homogeneity value from the variance of the pixels in the respective segments;
    determine a most homogenous region of the pixel image from the homogeneity value;
    calculate a first normalized accumulated histogram of the edge transitions within the most homogenous region;
    calculate a threshold value based on the first histogram;
    calculate a second normalized accumulated histogram of the edge transitions that are above the threshold value;
    calculate a gain of the image peaking from the second histogram;
    use the threshold value to select those pixels to which image peaking is to be applied; and
    apply the gain to the selected image pixels.

6. The non-transitory computer-readable medium according to claim 5, wherein the calculating of a gain comprises instructions for calculating the gain for a specific pixel to be equal to the maximum grey level of the image multiplied by the computed value multiplied by an output of a filter of the specific pixel.

7. The method of claim 1, said predetermined algorithm comprising:
    computing the edges between pixels; and
    ordering the computed edges from low to high.

8. The method of claim 7, wherein each of said computed edges is identified by an identifier and a value.

9. The method of claim 1, wherein the threshold value is calculated for the whole image and not for any individualized region within the image.

10. The method of claim 1, wherein the method is performed on every nth image in a plurality of images, wherein n is an integer greater than one.

11. The system of claim 3, said predetermined algorithm comprising:
   computing the edges between pixels; and
   ordering the computed edges from low to high.

12. The system of claim 11, wherein each of said computed edges is identified by an identifier and a value.

13. The system of claim 3, wherein the threshold value is calculated for the whole image and not for any individualized region within the image.

14. The non-transitory computer readable medium of claim 5, the instructions further causing the computer to:
   compute the edges between pixels; and
   order the computed edges from low to high.

15. The non-transitory computer readable medium of claim 14, wherein each of said computed edges is identified by an identifier and a value.

16. The non-transitory computer readable medium of claim 5, wherein the threshold value is calculated for the whole image and not for any individualized region within the image.

* * * * *